H. SEABURY.
POWER TRANSMISSION AND REVERSING GEARING.
APPLICATION FILED OCT. 11, 1915.
1,186,688.
Patented June 13, 1916.
2 SHEETS—SHEET 2.
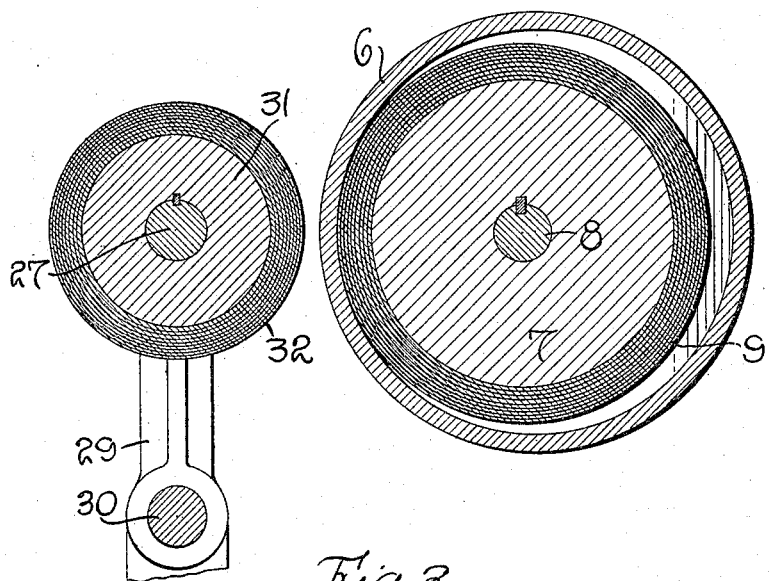
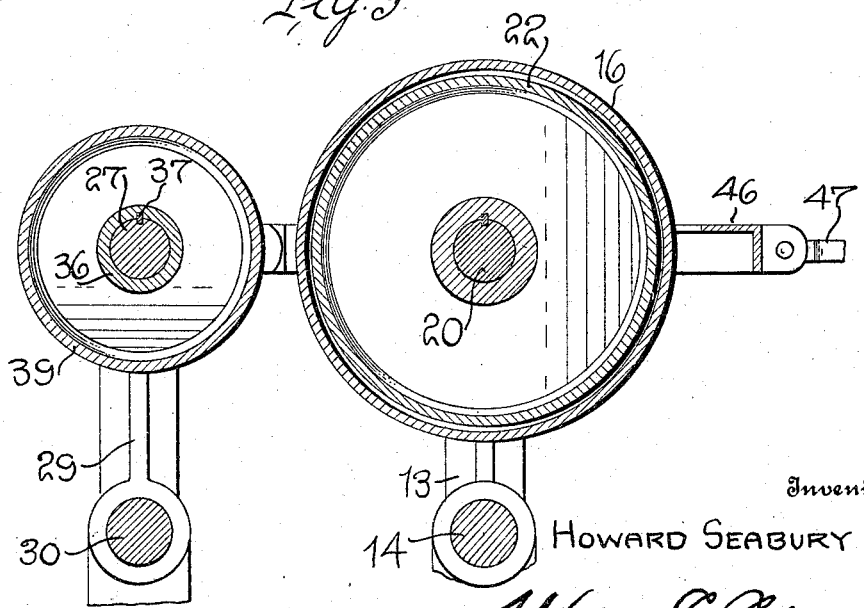
Inventor
HOWARD SEABURY
By Watson E. Coleman
Attorney

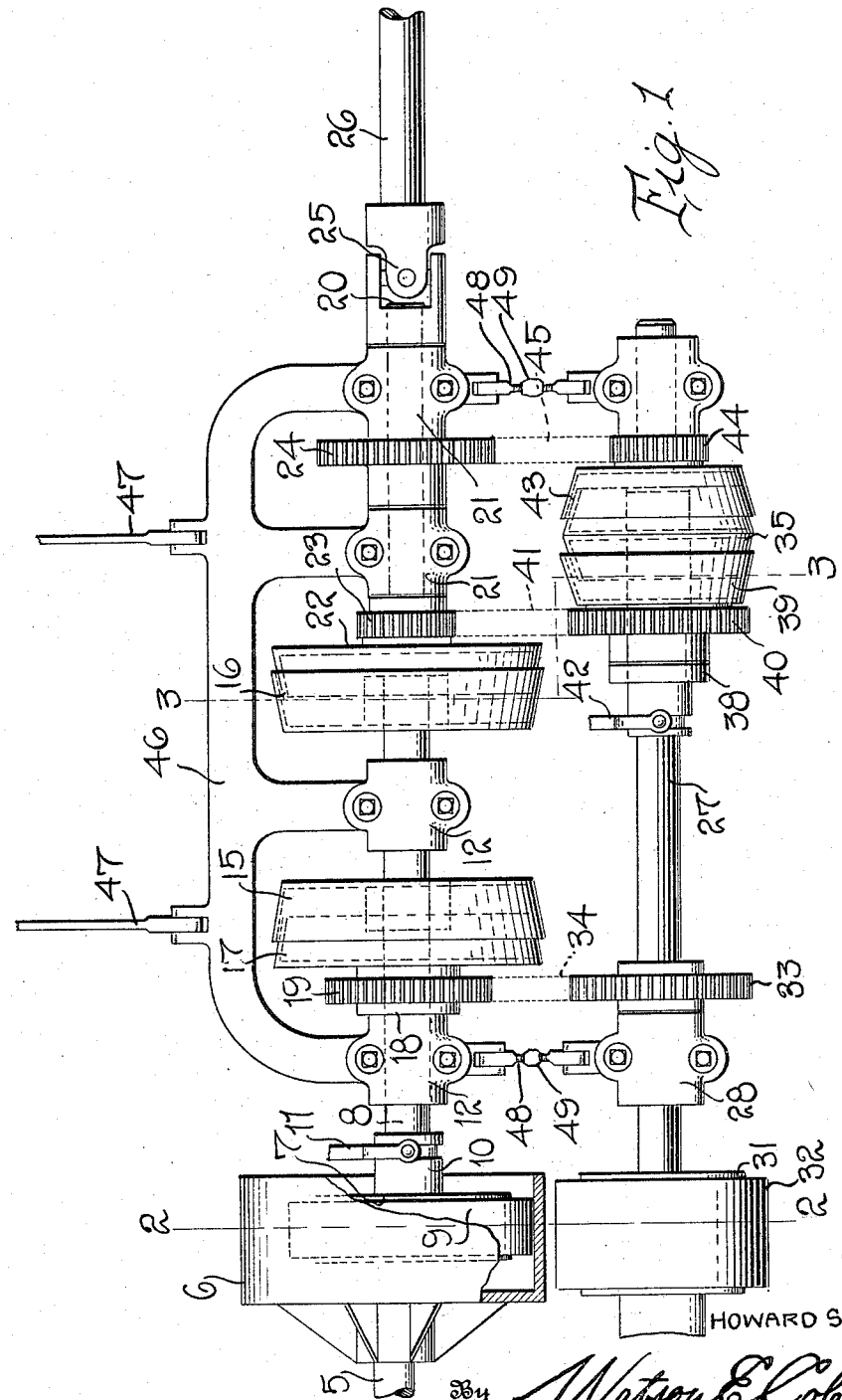

UNITED STATES PATENT OFFICE.

HOWARD SEABURY, OF TYLER, CALIFORNIA.

POWER-TRANSMISSION AND REVERSING GEARING.

1,186,688.  Specification of Letters Patent.  Patented June 13, 1916.

Application filed October 11, 1915. Serial No. 55,253.

*To all whom it may concern:*

Be it known that I, HOWARD SEABURY, a citizen of the United States, residing at Tyler, in the county of Nevada and State of California, have invented certain new and useful Improvements in Power-Transmission and Reversing Gearing, of which the following is a specification, reference being had to the accompanying drawings.

This invention relates to an improved power transmission and reversing gearing which is particularly designed for use upon motor vehicles, and has for its primary object to provide an improved mounting and arrangement of the several driving and driven elements whereby slippage or relative ineffective movement of said elements will be obviated.

It is another and more particular object of the invention to provide the driving and transmission shafts arranged in parallelism and mounted for oscillating movement, said shafts being equipped with friction wheels for engagement with the inner and outer surfaces, respectively, of a driving drum fixed upon the crank shaft of the engine, whereby, when the shafts are bodily oscillated, one or the other of the friction wheels is placed in operative relation to the drum so as to rotate the driven shaft in the desired direction.

With the above and other objects in view, my invention consists in the novel features of construction, combination and arrangement of parts to be hereinafter more fully described, claimed and illustrated in the accompanying drawings, in which, Figure 1 is a plan view illustrating the preferred embodiment of my improved power transmission and reversing mechanism; Fig. 2 is a section taken on the line 2—2 of Fig. 1; and Fig. 3 is a section taken on the line 3—3 of Fig. 1.

Referring in detail to the drawings, 5 indicates the crank shaft of the engine, upon which a drum 6 is keyed or otherwise securely fixed. This drum is open upon one side to receive the wheel 7 fixed upon one end of the driving shaft 8. The wheel 7 is provided with a laminated compressed paper rim 9 affording a frictional driving means for contact with the inner face of the annular wall of the drum 6. The wheel 7 is formed with a hub extension 10 to which a lever operated yoke 11 is connected in the usual manner, whereby the driving wheel, together with the shaft 8, may be axially shifted. The shaft 8 is mounted for rotative and sliding movement in suitable bearings 12 which are formed upon the upper ends of the standards 13, said standards being mounted at their lower ends for rocking or oscillating movement upon a fixed supporting rod or shaft 14. Upon the driving shaft 8, the spaced frictional cone clutch members 15 and 16, respectively, are fixed. A cone clutch member 17 is also loosely mounted upon the driving shaft 8 and engaged within the clutch member 15. This member 17 has a hub extension 18 upon which a sprocket wheel 19 is secured.

20 designates the driven shaft which is in axial alinement with the driving shaft 8 and is also journaled in bearings 21 which are provided with standards mounted upon the stationary rod 14 in a similar manner to the bearings 12. Upon one end of this driven shaft 20, the cone clutch member 22 is fixed, said member being engaged within the cone clutch member 16 on the driving shaft 8. This clutch member 22 also carries a relatively small sprocket wheel 23. A second larger sprocket wheel 24 is fixed upon the driven shaft 20 and the opposite end of this shaft is connected by the flexible joint 25 to a shaft section 26 which is connected to the differential gearing of the drive mechanism.

In spaced relation to the driving and driven shafts 8 and 20 and in parallelism with respect thereto, the power transmission shaft 27 is arranged, said shaft being journaled in the bearings 28 provided upon the upper ends of standards 29 which are mounted to rock or oscillate upon a second fixed rod or shaft 30. Upon the transmission shaft 27, a wheel 31 is secured having a laminated paper rim 32 for engagement with the exterior driving face of the drum 6. Upon the transmission shaft, in opposed relation to the sprocket wheel 19 on the driving shaft, a sprocket wheel 33 is fixed, and these sprockets are connected by a driving chain 34. A double cone clutch wheel 35 is formed with a hub sleeve or extension 36 which is keyed for longitudinal sliding movement, as at 37, upon the power transmission shaft 27. Upon this sleeve 36, between the double clutch wheel 35 and a fixed bearing collar 38 surrounding said sleeve, a clutch member 39 is loosely mounted for frictional engagement with one of the clutch faces of the wheel 35. This member 39 carries a sprocket wheel 40 which is connected by a driving chain 41 to the sprocket wheel 23 of the clutch member 22 fixed upon the driving shaft 20. To one end of the sleeve 36 which projects beyond the bearing collar 38, a lever operated yoke 42 is connected, whereby said sleeve and the double clutch wheel 35 may be axially shifted upon the shaft 27. A second cone clutch member 43 is also loosely mounted upon the shaft 27 for engagement by the other clutch face of the wheel 35 and this member 43 also carries a sprocket wheel 44 which is connected by the chain 45 to the sprocket wheel 24 fixed upon the shaft 20.

To the bearing standards in which the driving and driven shafts 8 and 20 are mounted, a laterally extending frame 46 is fixed, to which connecting rods 47 extending from a suitable controlling lever (not shown), are pivotally connected. One of the bearings 12 and one of the bearings 21 is connected by a sectional link 48 to the respective bearings 28 in which the transmission shaft 27 is journaled. The link sections are connected by an adjustable turn buckle 49.

Having above described the several structural features of my invention, its operation will be understood as follows. Assuming that the driving wheels 7 and 31 are in the positions illustrated, wherein the driving rim of the wheel 7 is engaged with the inner face of the drum 6, power will be transmitted directly from the engine shaft 5 to the driving shaft 8 in a forward direction. If the operator shifts the shaft 8 through the yoke connection 11 in a direction to engage the cone clutch member 16 fixed upon said shaft with the complementary clutch member 22 on the driven shaft 20, there will be a direct drive through shaft 26 to the differential while the clutch members 15 and 17 remain idle. The clutch members 39 and 43 on the transmission shaft are out of driving contact with the clutch wheel 34 and, therefore, the clutch element 43 will be rotated through the chain connection 45 to the sprocket wheel 24. The clutch member 39 will, of course, also be idly rotated through the chain connection 41 to the sprocket wheel 23. With the parts thus connected, the mechanism is operated at a medium driving speed.

When the shaft 8 is shifted in the opposite direction, the clutch element 15, fixed upon said shaft, is frictionally engaged with the clutch member 17 so as to lock the sprocket wheel 19 on the driving shaft, at the same time releasing the connection between the clutch elements 16 and 22. Power will now be transmitted through the chain 34 and sprocket wheel 33 to the transmission shaft 27. This permits the operator to transmit power to the driven shaft 20 in a forward direction at either high or low speed, by shifting the double clutch wheel 35 into frictional engagement with either of the opposed complementary clutch members 39 or 43. When this clutch wheel is in connection with the element 39, the shaft 20 is operated at a high speed through the chain connection 41 and, when connected to the element 43, said shaft will be operated at a relatively low speed through the chain connection 45.

When it is desired to reverse the rotation of the driven shaft, the lever connected by the rods 47 to the frame 46 is actuated, so as to oscillate the bearing standards upon the supporting rods 14 and 30 and thus swing the driving, driven and transmission shafts together, whereby the wheel 7 within the hollow drum 6 is moved out of frictional contact with the inner face of the drum and the friction rim 32 of the wheel 31 is moved into frictional driving contact with the outer face of the drum. Thus, the shaft 27 will be rotated in a reverse direction. By now shifting the double clutch wheel 35, power may be transmitted to the driven shaft 20 in a reverse direction and at either a high or low speed.

From the foregoing description, taken in connection with the accompanying drawings, the construction, manner of operation and several advantages of my invention will be clearly and fully understood. By employing the friction driving connections, together with the driving chains, the mechanism is practically silent in its operation, and the stripping of the gear teeth is also avoided, which is not an infrequent occurrence in the intermeshing gear type of power transmission. The mounting of the driving and transmission shafts for bodily oscillating movement permits the connections to be instantly made with the power shaft, whereby the machine is driven in the desired direction and without severe strain to the several elements of the mechanism. By the adjustment of the connecting links 48 between the bearings of the parallel shafts, said shafts may be properly spaced and wear of the frictional driving rims of the wheels 7 and 31 thus compensated for. I have above referred to a particular mounting of the parallel shafts for oscillating movement; but it will be understood that, in practice, the oscillating frame and bearing standards which support the shaft may be arranged and mounted in the body of the machine in various other ways as may be best adapted under the particular circumstances encountered. The mechanism itself is also susceptible of various modifications in the form, proportion and arrangement of the several coöperating parts and it will, therefore, be understood that I reserve the privilege of adopting all such legitimate changes as may be fairly embodied within the spirit and scope of the invention as claimed.

Having thus fully described my invention, what I desire to claim and secure by Letters Patent is:—

1. The combination of a power shaft, driving and transmission shafts, said latter shafts being mounted for bodily movement with respect to the power shaft, means on the driving and transmission shafts and the power shaft to effect a driving connection between either of the former with the latter by bodily shifting the driving and transmission shafts with respect to said power shaft, and driving connections between the transmission and driving shafts.

2. The combination of a power shaft, driving and transmission shafts arranged in spaced parallel relation and mounted for bodily movement with respect to the power shaft and provided with means for coöperative driving connection with the power shaft, driving connections between the transmission and driving shafts, means for shifting said driving and transmission shafts to effect a driving connection between either of said shafts and the power shaft whereby the driving shaft is driven in the same direction as the power shaft or in a reverse direction with respect thereto.

3. The combination of a power shaft, axially alined driving and driven shafts, a power transmission shaft, said driving, driven and transmission shafts being mounted for bodily oscillating movement, means on the driving and transmission shafts to effect an operative driving connection between either of said shafts and the power shaft when the former are shifted with respect to the latter, a manually operable clutch to connect the driving and driven shafts, and driving connections between said shafts and the power transmission shaft.

4. The combination of a power shaft, axially alined driving and driven shafts, a transmission shaft arranged in parallel relation to the driving and driven shafts, said shafts being mounted for unitary lateral oscillating movement, said driving and transmission shafts being provided with means to effect an operative driving connection with the power shaft when the former are oscillated to transmit rotation to the driven shaft in relatively opposite directions, a clutch element fixed to the driven shaft, a clutch element loose on the driving shaft, spaced clutch elements fixed upon the driving shaft to coöperatively engage the loose and fixed clutch elements on the driving and driven shafts respectively, and driving connections between said loose clutch elements and the power transmission shaft.

5. The combination of a power shaft, driving transmission shafts arranged in parallel relation and mounted for lateral oscillating movement, driving connections between said shafts, frictional driving means on said driving shaft for engagement with means on the power shaft when the driving and transmission shafts are oscillated, a driven shaft, and driving connections between the transmission shaft and the driving and driven shafts.

6. The combination of a power shaft, driving and transmission shafts arranged in parallel relation and mounted for lateral oscillating movement, driving connections between said shafts, frictional driving means on said driving shaft for engagement with means on the power shaft when the driving and transmission shafts are oscillated, adjustable means for spacing said shafts to take up wear of the frictional driving means, a driven shaft, and driving connections between the transmission shaft and the driving and driven shafts.

7. The combination of a power shaft provided with a drum, a driving shaft, a transmission shaft, oscillatable bearings supporting said driving and transmission shafts, friction drive wheels on said shafts adapted to engage the inner and outer peripheral faces respectively of the drum on the power shaft, a driven shaft, driving connections between the transmission shaft and the driving and driven shafts, an adjustable connection between the oscillatable bearings of the driving and transmission shafts, and means for oscillating the shaft bearings to engage either of the friction drive wheels on said shafts with the driving drum on the power shaft.

8. The combination of a power shaft provided with a drum, axially alined driving and driven shafts, oscillatable bearings for said driving and driven shafts, a transmission shaft, oscillatable bearings for the transmission shaft, adjustable connections between the bearings of the latter shaft and the bearings of the driving and driven shafts, friction drive wheels fixed upon the driving and transmission shafts respectively, for frictional engagement with the inner and outer faces of the drum, respectively, when the shaft bearings are oscillated in relatively opposite directions, and driving connections between said transmission shaft and the driving and driven shafts.

9. The combination of a power shaft, driving and transmission shafts arranged in parallel relation and mounted for bodily shifting movement, driving connections between said shafts, a drum on the power shaft, frictional driving means on said driving and transmission shafts arranged respectively, interiorly and exteriorly of said drum for alternate engagement therewith when said shafts are oscillated, a driven shaft, and driving connections between the transmission shaft and the driving and driven shafts.

10. The combination of a power shaft, driving and driven shafts, means for effecting a driving connection between said shafts, a transmission shaft, means for mounting the driving, driven and transmission shafts for bodily oscillating movement, driving means on the power shaft, means on the driving and transmission shafts for alternate engagement with said means on the power shaft when said first named shafts are oscillated, and means for effecting a driving connection with the transmission and driven shafts.

In testimony whereof I hereunto affix my signature in the presence of two witnesses.

HOWARD SEABURY.

Witnesses:
James L. Morgan,
J. A. Hustler.